United States Patent Office 2,880,214
Patented Mar. 31, 1959

2,880,214

17α ACETOXY PREGNANE AND PREGNENE COMPOUNDS

Robert B. Moffett, Kalamazoo, and Hugh V. Anderson, Oshtemo Township, Kalamazoo County, Mich., assignors to The Upjohn Company, Kalamazoo, Mich., a corporation of Michigan No Drawing. Application January 19, 1953
Serial No. 332,078

7 Claims. (Cl. 260—397.4)

The present invention relates to a novel class of steroid esters and is more particularly concerned with 17α-acetoxy steroids and to a process for the production thereof.

The novel compounds and the process of the present invention may be represented by the following formula:

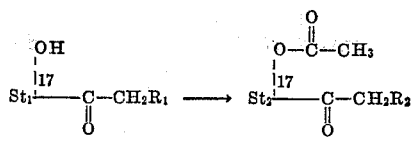

wherein $St_1$ represents a cyclopentanopolyhydrophenanthrene radical having both the indicated β-side chain and α-hydroxy group attached at carbon atom 17, wherein $St_2$ represents a cyclopentanopolyhydrophenanthrene radical which may be identical with $St_1$ or differ from it by the action of the acetylating agent on reactive groups in $St_1$, wherein $R_1$ is selected from the group consisting of hydrogen, hydroxy and acyloxy, acyloxy being of the formula AcO, in which Ac is the acyl radical of an organic carboxylic acid containing from one to eight carbon atoms inclusive, and wherein $R_2$ is selected from the group consisting of hydrogen and acyloxy, acyloxy being of the formula AcO defined as above.

The process of the present invention involves an acylation of the hitherto unacylated α-hydroxy group at carbon atom 17. It has repeatedly been stated in the art that the 17α-hydroxy group in steroids cannot be esterified [Fieser and Fieser, Natural Products Related to Phenathrene, 3rd ed., Reinhold Publishing Corporation, New York, N.Y., 1949, pp. 411 and 423; Reichstein, Helv. Chim. Acta 30, 205 (1947)], and this fact was attributed to steric hindrance at the 17α-position [Fieser and Fieser, Experientia 4, 285 (1948)]. The process of this invention makes it possible to obtain 17α-acetoxy compounds from 17α-hydroxy-20-ketosteroids.

An object of the present invention is to provide novel 17α-acetoxy-20-ketosteroids. Another object of the present invention is to provide a process for the production of 17α-acetoxy-20-ketosteroids. Other objects of the present invention will be apparent to those skilled in the art to which this invention pertains.

The novel compounds of the present invention have utility as stable, solid intermediates for the preparation of a new series of physiologically active compounds in which the sensitive ketol group is protected through acetylation of its 17α-hydroxy group. One of these novel compounds, for example, it is cortisone-17α,21-diacetate (Examples 4A to 4C and 5) which was tested and found to possess physiological activity of adrenocortical and glucocorticoid nature.

In carrying out the process of the present invention a 17α-hydroxy-20-ketosteroid is dissolved either in an acylating agent itself, such as, for example, isopropenyl acetate, acetic anhydride, acetyl halides or in a solvent which is nonreactive under the conditions of reaction and with a boiling point preferably between 65 and 150 degrees centigrade, e.g., benzene, toluene, o-xylene, m-xylene, ethylbenzene, or the like. To this solution is added the acetylating agent, such as isopropenyl acetate, acetic anhydride or an acetyl halide, for example, acetyl chloride, acetyl bromide or acetyl iodide, often in acetic acid solution and a catalyst which is selected from the group of strong acids, such as mineral acids, benzenesulfonic acids, such as toluenesulfonic acid, sulfosalicylic acid or other like substances. The mixture is then heated, preferably but not necessarily to the reflux temperature and the excess solvent is preferably distilled off at a rate depending on the concentrations used and the boiling point of the solvent. The total contact time may range between one quarter of an hour and 120 hours or even longer. If acetic anhydride (free of acetic acid) is used in a solvent other than acetic acid and no other acetylation takes place during the course of reaction, the rate and termination of the esterification can be determined by analysis for acetic acid in aliquot samples of the distillate. The final isolation of the product is usually carried out by removing the last quantity of excess solvent or reagent at low temperature through distillation at reduced pressure and by recrystallizing the material from solvents, such as methanol, ethanol, methylcyclohexane, ethyl acetate-hexanes (Skellysolve A), acetone-water and mixtures of these and like solvents.

The following examples are given to illustrate the method of the present invention and are not to be construed as limiting.

EXAMPLE 1

3β,17α-diacetoxy-5-pregnene-20-one

A solution of 0.9 gram of 3β-acetoxy-17α-hydroxy-5-pregnene-20-one (I), a compound known in the art [Percy L. Julian et al., J. Am. Chem. Soc. 71, 756 (1949)], and 0.15 gram of para-toluene-sulfonic acid monohydrate in twenty milliliters of isopropenyl acetate was heated to reflux temperature. The excess solvent was slowly distilled through a fractionating column during a period of about twelve hours. After cooling of the reaction mixture, one gram of sodium bicarbonate was added and the remaining isopropenyl acetate was removed by distillation under reduced pressure. The residue was taken up in ice-water and ether. The aqueous solution was extracted with ether and the combined ether extracts were washed with water, then dried over anhydrous sodium sulfate. Removal of the ether gave a crystalline solid which was recrystallized from methyl alcohol. The yield of the first crop was 0.6 gram or 58.2 precent with a melting point of 170–173 degrees centigrade. A second recrystallization from methanol resulted in a melting point of 173–177 degrees centigrade. The infrared spectrum was consistent with the postulated 3β,17α-diacetoxy-5-pregnene-20-one structure.

Analysis.—Percent calc. for $C_{25}H_{36}O_5$: C, 72.08; H, 8.71; $CH_3CO$, 20.66. Found: C, 72.26; H, 8.61; $CH_3CO$, 18.71.

Further structural proof was obtained by reducing 3β,17α-diacetoxy-5-pregnene-20-one with lithium aluminum hydride, followed by subsequent reacetylation of the product with acetic anhydride in pyridine to obtain known 3β,20-diacetoxy - 17α - hydroxy - 5 - pregnene (IV) [Hirschmann and Hirschmann, J. Biol. Chem. 187, 137 (1950)]. The identification of 3β,20-diacetoxy-17α-hydroxy-5-pregnene was made by determination of the melting point, infrared spectrum and the angle of rotation of ethyl alcohol. The sequence of these reactions is shown below:

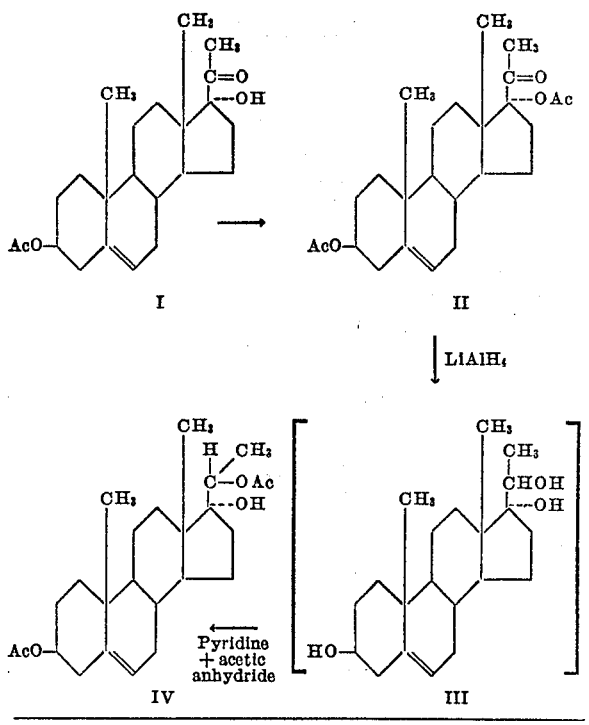

EXAMPLE 2

3,17α-diacetoxy-3,5-pregnadiene-20-one

In a manner similar to Example 1, 17α-hydroxyprogesterone was treated with isopropenyl acetate and para-toluensulfonic acid. The product after recrystallization from methanol had a melting point of 179 to 184 degrees centigrade. The infrared and ultraviolet spectra are consistent with the postulated structure of 3,17α-diacetoxy-3,5-pregnadiene-20-one.

EXAMPLE 3

3,17α,21-triacetoxy-2-allopregnene-20-one

In the same manner as described in Example 1, 17α-hydroxy-21-acetoxylallopregnane-3,20-dione was treated with isopropenyl acetate and para-toluenesulfonic acid. After chromatographing the product and crystallizing it from methylcyclohexane and ether, followed by a methanol-water recrystallization, a material was obtained of melting point 214 to 223 degrees centigrade, the analysis and the infrared spectrum of which confirmed the structure of 3,17α,21-triacetoxy-2-allopregnene-20-one.

3,17α,21triacetoxy-2-allopregnene-20-one may also be obtained by dissolving 17α-hydroxy-21-acetoxyallopregnane-3,20-dione in toluene and treating it with acetyl chloride and para-toluenesulfonic acid at reflux temperature.

EXAMPLE 4

Cortisone diacetate

Cortisone diacetate was prepared from 17α-hydroxy-21-acetoxypregnane-3,11,20-trione (V) as illustratively represented by the sequence of formulae below:

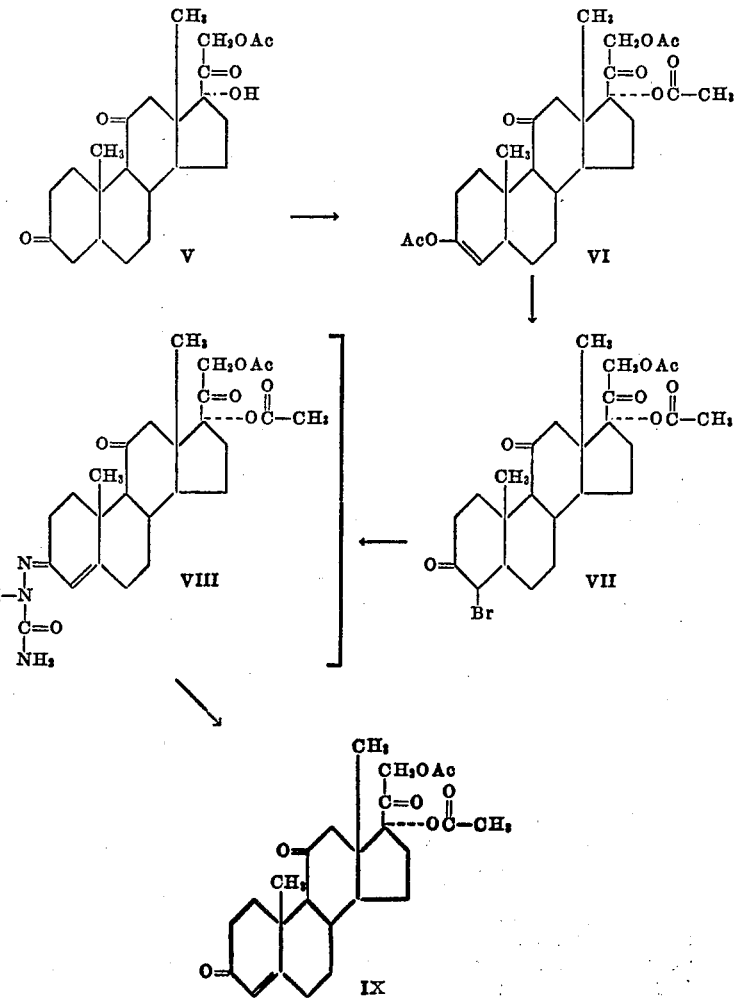

wherein AcO is an acetoxy group.

Acetylation of 17α-hydroxy-21-acetoxypregnane-3,11,20-trione (V), described in detail in Example 4A, yields 3,17α,21-triacetoxy-3-pregnene-11,20-dione (VI), which by bromination with N-bromosuccinimide and sulfuric acid gives 4-bromo-dihydrocortisone - 17α,21 - diacetate (VII) (Example 4B). Compound VII was converted to cortisone-17α,21-diacetate (IX) (Example 4C) by treatment with semicarbazide hydrochloride (to give the corresponding semicarbazone) (VIII), followed by treatment with pyruvic acid.

(4A)

*3,17α,21-triacetoxy-3-pregnene-11,20-dione (VI)*

A mixture of 4.054 grams of 17α-hydroxy-21-acetoxypregnane-3,11,20-trione, a known compound [Sarett, J. Am. Chem. Soc. 71, 2443 (1949)], 14.28 grams of acetic anhydride, 0.150 gram of sulfosalicyclic acid and 140 milliliters of toluene was refluxed in a 250-milliliter flask open to the atmosphere. A mixture of acetic anhydride, acetic acid and toluene was distilled through a column of about ten to fifteen theoretical plates. The reaction was essentially complete in 56 minutes as shown by a marked decrease in the amount of acetic acid being distilled. The reaction mixture was then cooled to room temperature, diluted with 100 milliliters of benzene, 100 milliliters of ether and twenty milliliters of ethyl acetate, washed four times with 200-milliliter portions of ice-water and then dried over anhydrous magnesium sulfate. The solvents were removed in vacuo and the remaining solid was recrystallized from methanol-water. The yield was 3.727 grams of material corresponding to a 76.2 percent yield. Recrystallization from ethyl acetate-hexanes (Skellysolve A) and then acetone-water resulted in a material of melting point 140.6–148.0 degrees centigrade.

*Analysis.*—Percent calculated for $C_{27}H_{36}O_8$: C, 66.37; H, 7.43. Found: C, 66.60; H, 7.37.

In the same manner 3,17α,21-triacetoxy-3-pregnene-11,20-dione may be prepared by substituting acetyl chloride for the acetic anhydride in the foregoing preparation.

(4B)

*4-bromo-17α,21-diacetoxypregnane-3,11,20-trione*

One and nine hundred fifty-four thousandths grams (1.954 grams) of 3,17α,21-triacetoxy-3-pregnene-11,20-dione (Example 4A) was dissolved in 100 milliliters of tertiary butyl alcohol in a 500-milliliter flask. To this solution were added: 0.780 gram of N-bromosuccinimide in 100 milliliters of tertiary butyl alcohol and sixty milliliters of 0.8 Normal sulfuric acid solution. The reaction mixture was left standing at room temperature for a period of 100 minutes and thereafter was added 3.78 grams of sodium sulfite in 100 milliliters of water. The solution was concentrated in vacuo to about fifteen milliliters and to the resulting suspension was added 200 milliliters of water. The solid, 4-bromo-17α,21-diacetoxypregnane-3,11,20-trione which was formed was filtered off and dried. The crude material weighed 2.0806 grams equal to 96.5 percent yield. The crude material was recrystallized from acetone and water (twenty milliliters of acetone and eight milliliters of water) and finally from ethyl acetate and Skellysolve B. The melting point was 186–187 degrees centigrade.

*Analysis.*—Percent calc. for $C_{25}H_{33}O_7Br$: C, 57.14; H, 6.33; Br, 15.21. Found: C, 57.01; H, 6.02; Br, 14.76.

(4C)

*Cortisone-17α,21-diacetate*

One and forty-two hundredths grams (1.420 grams) of 4 - bromo - 17α,21 - diacetoxypregnane - 3,11,20 - trione were dissolved in a solution consisting of 28 milliliters of water and 112 milliliters of dioxane. To this solution was added 0.605 gram of semicarbazide hydrochloride and 0.443 gram of anhydrous sodium acetate. The solids dissolved readily and a yellow color developed after about two minutes which persists for about half an hour. After standing for two hours at room temperature, 1.4 milliliters (0.019 mole) of a solution of freshly-distilled pyruvic acid in water was added and the solution was heated to sixty degrees centigrade and kept at this temperature during a period of three hours. The reaction mixture was then cooled to room temperature, diluted with 800 milliliters of water, and extracted with three 200-milliliter portions and one 100-milliliter portion of methylene dichloride. The combined extracts were then washed with 250 milliliters of ice-cooled, two percent sodium hydroxide solution to remove excess acid, and then with 250 milliliters of water. The extracts were dried over anhydrous sodium sulfate and the solvent was removed by a stream of air. The crude, solid cortisone diacetate thus obtained weighed 1.1526 grams equal to a yield of 95.9 percent. The melting point of the recrystallized material was 216.5–218 degrees centigrade.

*Analysis.*—Percent calculated for $C_{25}H_{32}O_7$: C, 67.55; H, 7.26. Found: C, 66.98; H, 7.06.

In the same manner as given in Example 4, 17α-acetoxy-21-acyloxy-cortisone may be prepared by using as starting material V, a 17α-hydroxy-21-acyloxypregnane-3,11,20-trione wherein the 21-acyloxy group is AcO, Ac being the acyl radical of an organic carboxylic acid containing from one to eight carbon atoms, inclusive. These starting materials may be prepared by hydrolyzing with acids or bases 17α-hydroxy-21-acetoxypregnane-3,11,20-trione to obtain 17α,21-dihydroxypregnane-3,11,20-trione, which by treatment with an acid anhydride or halide yields the corresponding 17α-hydroxy-21-acyloxypregnane-3,11,20-trione. The 21-formyloxy ester may be obtained by treatment of 17α,21-dihydroxypregnane-3,11,20-trione with formic acid.

Representative 17α-hydroxy-21-acyloxypregnane-3,11,20-triones which may be thus obtained include: 17α-hydroxy - 21 - formyloxypregnane - 3,11,20 - trione, 17α-hydroxy - 21 - propionoxypregnane - 3,11,20 - trione, 17α-hydroxy - 21 - butyroxypregnane - 3,11,20 - trione, 17α-hydroxy - 21 - isobutyroxypregnane - 3,11,20 - trione, 17α - hydroxy - 21 - valeroxypregnane - 3,11,20 - trione, 17α - hydroxy - 21 - isovaleroxypregnane - 3,11,20 - trione, 17α - hydroxy - 21 - hexanoyloxypregnane - 3,11,20 - trione, 17α - hydroxy - 21 - heptanoyloxypregnane - 3,11,20-trione, 17α - hydroxy - 21 - octanoyloxypregnane - 3,11, 20 - trione, 17α - hydroxy - 21 - benzoyloxypregnane-3,11,20-trione, 17α-hydroxy-21-phenylacetoxypregnane-3,11,20-trione, 17α-hydroxy-21-(β-cyclopentyl)-propionoxypregnane-3,11,20-trione, and similar like compounds.

These compounds, when subjected to the sequence of steps described in Examples 4A, 4B and 4C, which consist in vigorous acetylation, bromination, treatment with semicarbazide and pyruvic acid, yield the corresponding 17α-acetoxy-21-acyloxycortisones, namely: 17α-acetoxy-21-formyloxycortisone, 17α-acetoxy-21-propionoxycortisone, 17α-acetoxy-21-butyroxycortisone, 17α-acetoxy-21-isobutyroxycortisone, 17α-acetoxy-21-valeroxycortisone, 17α - acetoxy - 21 - isovaleroxycortisone, 17α - acetoxy-21 - hexanoyloxycortisone, 17α - acetoxy - 21 heptanoyloxycortisone, 17α-acetoxy-21-octanoyloxycortisone, 17α-acetoxy - 21 - benzoyloxycortisone, 17α - acetoxy - 21-phenylacetoxycortisone, 17α-acetoxy-21-(β-cyclopentyl)-propionoxycortisone, and similar like compounds.

EXAMPLE 5

*Cortisone-17α,21-diacetate (alternate procedure)*

Cortisone-21-acetate was refluxed for a period of two hours with acetic anhydride, acetic acid and toluene in the presence of sulfosalicylic acid. Cortisone-17α,21-diacetate was obtained.

Alternatively, by using other 21-esters of cortisone in Example 5 such as, for example, the formate, propionate, butyrate, isobutyrate, valerate, isovalerate, hexanoate, heptanoate, octanoate, β-cyclopentylpropionate, benzoate, phenylacetate and similar like 21-esters of cortisone, the following representative compounds may be prepared: 17α-acetoxy-21-formyloxycortisone, 17α-acetoxy-21-propionoxycortisone, 17α-acetoxy-21-butyroxycortisone, 17α-acetoxy-21-isobutyroxycortisone, 17α-acetoxy-21-valeroxycortisone, 17α-acetoxy-21-isovaleroxycortisone, 17α-acetoxy-21-hexanoyloxycortisone, 17α-acetoxy-21-heptanoyloxycortisone, 17α-acetoxy-21-octanoyloxycortisone, 17α-acetoxy-21-(β-cyclopentyl)-propionoxycortisone, 17α-acetoxy-21-benzoyloxycortisone, 17α-acetoxy-21-phenylacetoxycortisone, and similar like 21-esters of 17α-acetoxycortisone.

EXAMPLE 6

*3,17α,21-triacetoxy-3,5-pregnadiene-20-one*

In the same manner as given in Example 1, 17α,21-dihydroxy-4-pregnene-3,20-dione (Reichstein's Compound S) was treated with isopropenylacetate and para-toluenesulfonic acid. The resulting reaction mixture was worked up as described in Example 1. The crude product was boiled with methanol and cooled in the refrigerator. The crude crystals thus-obtained were further purified by chromatographing over florosil (synthetic magnesium silicate). Three crystalline fractions were obtained by eluting with a mixture of benzene and ether which were combined and recrystallized from methanol. The thus-obtained product of melting point 138 to 140 degrees centigrade was shown to be 3,17α,21-triacetoxy-3,5-pregnadiene-20-one by infrared and ultraviolet spectra.

*Analysis.*—Percent calc. for $C_{27}H_{36}O_7$: C, 68.63; H, 7.68; acetyl, 27.32. Found: C, 68.57; H, 7.39; acetyl, 26.59.

In a manner substantially identical with that of Examples 1 through 5, the following representative compounds may be prepared by reaction of the selected 3,11,17α,21-tetrahydroxypregnane-20-ones and the 3,11,21-triacyloxy-17α-hydroxypregnanes-20-ones with an acetylating agent in the present of an acidic catalyst: 3α,11α,17α,21-tetraacetoxypregnane-20-one, 3β,11α,17α,21-tetraacetoxypregnane-20-one, 3α,17α,21-triacetoxy-11β-hydroxypregnane-20-one, 3β,17α,21-triacetoxy-11β-hydroxypregnane-20-one, 3α,21-dipropionoxy-17α-acetoxy-11β-hydroxypregnane-20-one, 3β,11α,21-tributyroxy-17α-acetoxypregnane-20-one, 3α,11α-divaleroxy-17α-acetoxypregnane-20-one, 3β,21-dehexanoyloxy-11β-hydroxy-17α-acetoxypregnane-20-one, 3α,11α,21-tribenzoyloxy-17α-acetoxypregnane-20-one, 3β,11α,21-triheptanoyloxy-17α-acetoxypregnane-20-one, 3α,11α,21-trioctanoyloxy-17α-acetoxypregnane-20-one and similar related compounds.

It is to be understood that the invention is not to be limited to the exact details or exact compounds shown and described as obvious modifications and equivalents will be apparent to one skilled in the art, and the invention is therefore to be limited only by the scope of the appended claims.

We claim:

1. A process for the production of a 17α-acetoxy-21-acyloxycortisone, which comprises: reacting a 21-acyloxycortisone with an acetylating agent, in the presence of a catalyst selected from the group consisting of mineral acids and benzene-sulfonic acids, at a temperature between about 65 degrees centigrade and the reflux temperature of the mixture.

2. The process of claim 1 wherein the starting material, a 21-acyloxycortisone, is 21-acetoxycortisone.

3. A process for the production of 17α-acetoxy-21-acyloxycortisone, wherein the acyloxy group is AcO, Ac being the acyl radical of an organic carboxylic acid having from one to eight carbon atoms inclusive, which comprises: reacting a 17α-hydroxy-21-acyloxypregnane-3,11,20-trione with an acetylating agent in the presence of a catalyst selected from the group consisting of mineral acids and benzene-sulfonic acids, at a temperature between about 65 degrees centigrade and the reflux temperature of the mixture, to obtain 3,17α-diacetoxy-21-acyloxy-3-pregnene-11,20-dione, brominating the thus-obtained 3,17α-diacetoxy-21-acyloxy-3-pregnene-11,20-dione, to obtain 4-bromo-17α-acetoxy-21-acyloxypregnane-3,11,20-trione, treating this compound with a hydrazine compound which is substituted at only one amino group to form the corresponding substituted 3-hydrazone of 17α-acetoxy-21-acyloxy-4-pregnene-3,11,20-trione, and treating this 3-hydrazone with aqueous pyruvic acid to obtain 17α-acetoxy-21-acyloxycortisone.

4. A process for the production of 17α,21-diacetoxycortisone which comprises: reacting 17α-hydroxy-21-acetoxypregnane-3,11,20-trione with an acetylating agent, in the presence of a catalyst selected from the group consisting of mineral acids and benzene-sulfonic acids, at a temperature between about 65 degrees centigrade and the reflux temperature of the mixture, to obtain 3,17α,21-triacetoxy-3-pregnene-11,20-dione, treating the thus-obtained 3,17α,21-triacetoxy-3-pregnene-11,20-dione with N-bromosuccinimide and aqueous sulfuric acid to obtain 4-bromo-17α,21-diacetoxy-pregnane-3,11,20-trione, reacting 4-bromo-17α,21-diacetoxypregnane-3,11,20-trione with semicarbazide to obtain the 3-semicarbazone of 17α,21-diacetoxy-4-pregnene-3,11,20-trione, and treating the 3-semicarbazone with aqueous pyruvic acid to obtain 17α,21-diacetoxycortisone.

5. 3,17α,21-triacetoxy-3-pregnene-11,20-dione.

6. A process for the production of a compound of the 17α-acetoxy-20-ketopregnane series which comprises: reacting a compound of the 17α-hydroxy-20-ketopregnane series with an acetylating agent, in the presence of a catalyst selected from the group consisting of mineral acids and benzene-sulfonic acids at a temperature between about 65 degrees centigrade and the reflux temperature of the mixture to produce the corresponding 17α-acetoxy-20-ketopregnane.

7. 4-bromo-17α,21-diacetoxypregnane-13,11,20-trione.

References Cited in the file of this patent

UNITED STATES PATENTS 2,239,012     Miescher _____ Apr. 22, 1941

FOREIGN PATENTS 236,013       Switzerland _____ May 16, 1945

OTHER REFERENCES

Fieser et al.: Natural Products Related to Phenanthrene, 3rd ed., page 407 (1949).

Reichstein: Helv. Chim. Acta 20, 978–991 (1937).